United States Patent
Yoshida et al.

[15] 3,659,973
[45] May 2, 1972

[54] CENTER MECHANISMS FOR PRESSES TO SHAPE AND CURE TIRES

[72] Inventors: Shoushi Yoshida; Atsuaki Iwama; Takashi Okada; Tetsuo Suda, all of Kobe, Japan

[73] Assignee: Kobe Steel, Ltd., Kobe, Japan

[22] Filed: Oct. 5, 1970

[21] Appl. No.: 78,019

[30] Foreign Application Priority Data

Oct. 6, 1969 Japan..................................44/80069

[52] U.S. Cl..................................425/29, 425/58
[51] Int. Cl..................................B29h 5/02
[58] Field of Search..................18/17 K, 17 W, 17 C, 2 HA

[56] References Cited

UNITED STATES PATENTS

| | | | |
|---|---|---|---|
| 3,292,208 | 12/1966 | Wood | 18/2 HA |
| 3,461,502 | 8/1969 | Turk et al | 18/17 K |
| 3,487,507 | 1/1970 | Turk | 18/17 C UX |
| 3,581,345 | 6/1971 | Ulm et al | 18/17 K |

*Primary Examiner*—J. Howard Flint, Jr.
*Attorney*—Hamilton, Renner & Kenner

[57] ABSTRACT

A center mechanism for a press for shaping and curing tires having a bladder member including, a vertical power cylinder of non-magnetic material, a piston in the power cylinder attached to the bladder to selectively erect and collapse it and constructed at least partially of magnetic material, and a magnetic sensor positioned exteriorly of the power cylinder and controlling movement of the piston responsive to a detected position of the piston.

3 Claims, 1 Drawing Figure

Patented May 2, 1972

3,659,973

INVENTORS
SHOUSHI YOSHIDA
ATSUAKI IWAMA
BY TAKASHI OKADA
TETUO SUDA

Hamilton, Cook, Renner
& Kenner
ATTORNEYS

CENTER MECHANISMS FOR PRESSES TO SHAPE AND CURE TIRES

BACKGROUND OF THE INVENTION

The present invention relates generally to a press for shaping and curing unvulcanized tires and more particularly to a press having a permanent bag or bladder controllably erected and distended by action of a vertical cylinder and moving piston. Specifically, a center mechanism controls the bladder so that adjustment associated with a change of the size of tire to be shaped and cured in the press is facilitated and the service life of the bladder is extended, while an appreciable simplification of the center mechanism construction, maintenance, and control is achieved.

In presses having relatively movable mold sections to shape and cure tires with a bladder controlled by means of a vertical cylinder and moving piston, it has been found advantageous to provide that the clamping device which holds the upper circular bead of the bladder be stopped at a given upper limit which may be changed in accordance with a change in the size of the tire to be shaped and cured and be readily adjustable to stop at a plurality of intermediate heights as may be found necessary for different tire sizes. According to the known art of tire press design, the moving piston is made in a double construction to comply with the preceding conditions in such a manner that a spacer is installed on a connecting rod between the upper and lower pistons halves to define the upper limit of travel of the clamping device. In such construction, the connecting rod extends freely movably through a cylindrical sleeve in the upper half of said piston and has its upper end secured to the clamping device holding the upper circular bead of the bladder and its lower end secured to the lower half of the piston, both halves of said piston sliding in a common cylinder. In order to cause incremental vertical movement of the clamping device holding the upper circular bead of the bladder, fluid pressure is varied in a compartment disposed between the two halves of the piston and another compartment limited by the lower half of the piston and the closed bottom end of the vertical power cylinder.

In operation for tire positioning onto and withdrawal from the press, the bladder is elongated and reduced to a minimum radius by introducing fluid pressure in the compartment under the lower half of the piston to exert force on both the upper and lower halves of the piston until the upper half engages a fixed cap member at the upper end of the cylinder and the lower half engages the upper half, thereby defining the upper limit position of the piston stroke which may be adjusted as required by means of spacer sleeves of appropriate length placed between the two halves of the piston. For positioning the center mechanism components after the curing fluid is charged into the bladder under pressure, the internal fluid pressure in both compartments is reduced to lower both halves of said piston to achieve the lower limit position of the clamping device for the upper circular clamping bead of the bladder. Finally, for setting the limiting position of the clamping device for the upper circular clamping bead of the bladder to a location between the upper and lower limit positions in order, for example, to bring the clamping device level with the upper bead of an uncured tire or to seat the uncured tire in the mold section, fluid pressure is introduced between the halves of the piston, the upper half of the piston remaining against the cap member at the upper end of the cylinder while the lower half of the piston moves downwardly. The lower half of the piston is lowered until the underside of the clamping device for the upper circular clamping bead of the bladder engages the top of a second spacer sleeve detachably mounted on the upper half of the piston when the lower half of the piston has been moved downwardly to the desired position, the spacer sleeve freely movably encasing the connecting rod of the lower half of the piston. This enables the clamping device for the upper circular clamping bead of the bladder to be stopped at any selected position between the upper and lower limit positions thereof by substituting for the detachably mounted second spacer sleeve a spacer sleeve of appropriate length.

Thus, for the purpose of controlling the bladder with respect to the position thereof in the described manner, two different spacer sleeves, one above the upper half of the piston and another above the lower half of the same, located in the cylinder in the center mechanism need to be changed, thereby necessitating removal of the top cap of the cylinder and subsequent withdrawal of the piston therein for every change in size of tires to be shaped and cured in the press. The procedures necessary for changing of the spacers require substantial time and effort which results in a loss in productivity of the press, in addition to the requisite care which complicates overall servicing of the center mechanism and maintenance of the spacers. In addition to these practical difficulties associated with the press operation and spacer maintenance, the constructional disadvantage that sealing means cannot be provided for the connecting rod or the spacer sleeve above the upper half of the piston against the ingress of curing fluid from the bottom of the compartment inside the bladder, because the spacer sleeve is, when carried with the upper half of the piston to the lower limit position when the curing is being performed, below the cap on the cylinder thus forming an annular opening permitting the entry of the curing fluid into the cylinder, making it inevitable that the inside of the center mechanism is cyclically heated and cooled with the control of fluids to the bladder. This operation intensifies a drawback inherent in such tire shaping and curing presses in that characteristic efficiencies, in both heating and cooling of the bladder, are increased accordingly. Further, the curing fluid which enters the cylinder gives rise to overheating of packing components of sealing members thereby leading to a reduced service life of the sealing members.

SUMMARY OF THE INVENTION

It is a primary object of the present invention to provide a center mechanism of a press for shaping and curing tires, free from all the difficulties inherent in the existing presses of the type described above and capable of adjusting the piston motion exteriorly of the press with extreme ease for incremental control of the piston motion to accommodate change of the size of the tire to be shaped and cured in the press and of ensuring an improved service life for piston packing components by not subjecting them to curing fluids and the deleterious heating and cooling effects thereof.

Another object of the present invention is to provide a center mechanism of a press for shaping and curing tires having a collapsible bladder and a center vertical power cylinder controlling said bladder and wherein no internal spacer is required to be changed to effect a change in size of the tire to be shaped and cured, thereby providing appreciable savings in time and labor. These objects may be accomplished by incorporating a non-magnetic vertical power cylinder accommodating a power piston containing magnetic material and a magnetic-sensitive switch, or other magnetic pickup device, mounted exteriorly of the non-magnetic vertical power cylinder, capable of being adjusted to any desired position along said power cylinder and linked with control devices regulating the supply of pressure fluid to both sides of the power piston.

Other objects and a fuller understanding of the present invention may be had by referring to the following description of a preferred embodiment taken in conjunction with the accompanying drawings; however, no attempt is made to show various forms and modifications in which the invention might be embodied, the scope of this invention being measured solely by the scope of the appended claims.

DESCRIPTION OF THE PREFERRED EMBODIMENT

Figure 1:
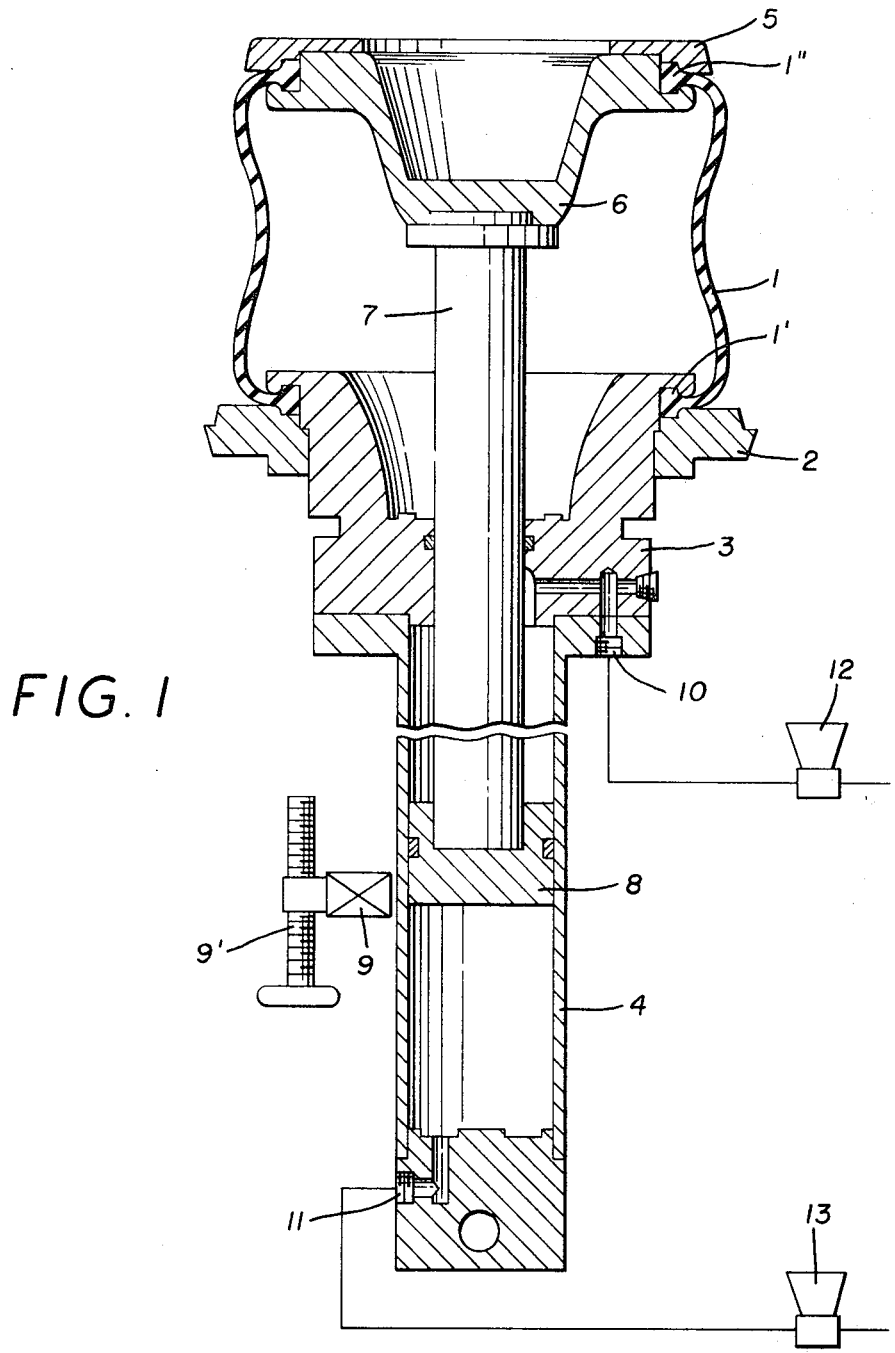
FIG. 1 is a lateral cross-sectional view, with portions omitted for the sake of simplicity, of a center mechanism according to a preferred form of the present invention.

As seen in the drawings, a bladder 1 is mounted in a press for shaping and curing a tire and is positioned between two relatively movable mold halves (not illustrated) in a conventional manner, preferably a stationary lower half and a moving upper half mounted to rise or descent according to the operation of the press. The lower end of the bladder 1 is secured by a lower plate ring 3 which holds down the lower circular clamping bead 1' of the bladder onto the lower bead ring 2 which is positioned proximate the stationary lower half of the mold. The plate ring 3 is attached in a conventional manner to a vertical power cylinder 4. The bladder has an upper circular clamping bead 1" which is clamped between an upper bead ring 5 and an upper plate ring 6 attached to and controlled, with respect to the vertical movement thereof, by a rod 7 connected to a power piston 8 operating in power cylinder 4 for selective erection and collapse of the ladder 1.

A significant feature of the present invention is that the vertical power cylinder 4 is made of non-magnetic material, such as an aluminum alloy, while the power piston 8 is made entirely of magnetic metal, such as steel, or otherwise made magnetic, as by mounting a suitable ring of magnetic material around the piston. A magnetic-sensitive switch 9, or other magnetic sensor or detection device, is mounted proximate the outside surface of the vertical power cylinder 4 in such a manner that it can be adjusted to any selected vertical position longitudinally along said cylinder 4 as by aid of a suitable device, such as an adjusting screw 9' or the like. The magnetic-sensitive switch 9 is in turn connected to remote control valves 12 and 13 which control flow of hydraulic fluid to the power piston 8 through the inlet orifices 10 and 11 in cylinder 4 for the purpose of operating said control valves 12 and 13 in response to electric signals transmitted by said switch 9 in a manner apparent to persons skilled in the art. Another feature of the present invention is that the hydraulic fluid charged into the vertical power cylinder 4 controls the movement of the power piston 8, either upward or downward, which in turn moves rod 7 and upper plate ring 6 and accordingly gives rise to erection or collapse of the bladder during operation and for clamping or unclamping the upper circular clamping bead 1".

Installation of the magnetic sensitive switch 9 outside the vertical power cylinder 4, as described above, enables the power piston 8 to actuate the switch 9 upon magnetically sensing an equivalent level of the power piston 8, whereby the switch 9 transmits an electrical signal through a suitable amplifying means (not shown) to either of the remote control valves 12 or 13, as the case may be, which is thereby closed to seal the hydraulic fluid in the vertical power cylinder 4 to hold the power piston 8 at the existing level or setting position of the magnetic-sensitive switch 9. Inasmuch as the magnetic-sensitive switch 9 can be adjusted to any desired level along the vertical power cylinder 4, a change of stroke of the piston 8 and a change of stop position at an intermediate position of said piston 8, depending on a change in size of the tire to be shaped and cured in the press, may be readily accomplished by a mere change of the setting position of the magnetic-sensitive switch 9 along the vertical power cylinder 4 for easy volumetric control of the bladder 1 with respect to the reaction and collapse best matching the size of a particular tire, with no need whatsoever for components to be changed interiorly of the vertical power cylinder 4 of the center mechanism. The above construction eliminates the inclusion of curing fluid into the vertical cylinder 4, so that, unlike the conventional center mechanism for the bladder, it offers the valuable advantage that the heating and cooling fluid is never introduced into the cylinder 4, thereby minimizing the thermal loss for tire shaping and curing and greatly extending the life of the packing used as sealing members.

Although the description of the present invention has been made with a degree of particularity requisite for understanding by persons skilled in the art, it is to be understood that the present disclosure has been made only by way of example and that numerous changes in the details of construction and the combination and arrangement of parts may be resorted to without departing from the spirit and the scope of the present invention as hereinafter claimed.

We claim:

1. A center mechanism for a press for shaping and curing tires comprising, vertical power cylinder means of non-magnetic material, piston means in said cylinder means operatively connected to a bladder for selective erection and collapse thereof and at least partially constructed of magnetic material, and magnetic sensor means positioned exteriorly of said cylinder means and controlling movement of said piston means responsive to a detected position thereof.

2. A center mechanism according to claim 1, wherein said magnetic sensor means is selectively positionable along said vertical power cylinder.

3. A center mechanism according to claim 1, wherein said magnetic sensor means operate valve means controlling the flow of fluid to position said piston means in said cylinder means.

* * * * *